(12) United States Patent
Park (10) Patent No.: US 12,258,073 B2
(45) Date of Patent: Mar. 25, 2025

(54) UNITARY STRUCTURAL COMPONENT FOR VEHICLE FLOOR

(71) Applicants: Hyundai Motor Company, Seoul (KR); Kia Corporation, Seoul (KR)

(72) Inventor: Tae Soo Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 274 days.

(21) Appl. No.: 17/901,345

(22) Filed: Sep. 1, 2022

(65) Prior Publication Data

US 2023/0322307 A1 Oct. 12, 2023

(30) Foreign Application Priority Data

Apr. 11, 2022 (KR) .......................... 10-2022-0044673

(51) Int. Cl.
*B62D 25/20* (2006.01)
*B62D 21/15* (2006.01)

(52) U.S. Cl.
CPC ....... *B62D 25/2009* (2013.01); *B62D 21/157* (2013.01); *B62D 25/20* (2013.01); *B60Y 2306/01* (2013.01)

(58) Field of Classification Search
CPC .... B62D 25/20; B62D 25/2009; B62D 21/15; B62D 21/157; B62D 21/02; B62D 29/08; B60Y 2306/01

USPC ............. 296/24, 193.07, 203.01, 23.01, 3, 4
See application file for complete search history.

(56) References Cited

U.S. PATENT DOCUMENTS

| | | | |
|---|---|---|---|
| 4,898,419 A | 2/1990 | Kenmochi | |
| 4,907,735 A | 3/1990 | Ushioda | |
| 5,496,067 A | 3/1996 | Stoll | |
| 6,523,876 B1 | 2/2003 | Durand | |
| 8,985,680 B2 | 3/2015 | Mildner | |
| 9,108,682 B2 * | 8/2015 | Mori | B62D 25/2036 |
| 9,580,105 B2 * | 2/2017 | Oh | B62D 21/02 |
| 9,688,315 B2 | 6/2017 | Peschansky | |
| 10,160,407 B2 * | 12/2018 | Murasawa | B60R 13/083 |
| 11,148,721 B2 | 10/2021 | Liu | |
| 11,420,686 B2 * | 8/2022 | Matsuda | B62D 25/20 |
| 2010/0133878 A1 | 6/2010 | Teli | |
| 2010/0259071 A1 | 10/2010 | Enns | |

FOREIGN PATENT DOCUMENTS

JP H04300792 A 10/1992

* cited by examiner

*Primary Examiner* — Dennis H Pedder
(74) *Attorney, Agent, or Firm* — Slater Matsil, LLP (57) ABSTRACT

An embodiment unitary structural component for attaching to a floor of a vehicle, the unitary structural component including a first cross portion, a second cross portion spaced apart from the first cross portion, and a central extension connecting the first cross portion and the second cross portion and extending along a central longitudinal axis of the floor, wherein the first cross portion, the second cross portion, and the central extension define a unitary one-piece structure.

20 Claims, 7 Drawing Sheets

UNITARY STRUCTURAL COMPONENT FOR VEHICLE FLOOR

CROSS-REFERENCE TO RELATED APPLICATIONS

This application claims the benefit of Korean Patent Application No. 10-2022-0044673, filed on Apr. 11, 2022, which application is hereby incorporated herein by reference.

TECHNICAL FIELD

The present disclosure relates to a unitary structural component for a vehicle floor.

BACKGROUND

A vehicle includes a floor made of a steel material, and a plurality of associated components are attached to the floor through fasteners, welding, or the like. The associated components are configured to enhance the stiffness and strength of the floor and to mount interior components such as vehicle seats to a vehicle body. For example, the associated components may be a plurality of cross members, a plurality of longitudinal members, and a plurality of brackets.

As such, a plurality of associated components are assembled on the floor through fasteners, welding, etc., and thus it may be difficult to implement simplification of an assembly process, layout of interior components, and simplification of interior styling.

In addition, a quality management cost for managing a gap or a height difference between the floor and the associated components is excessively spent, and it is not possible to secure the gap between the floor and the associated components due to variation in manufacturing tolerance, and thus there is a high possibility of noise and buzz, squeak, and rattle (BSR) occurring.

Some vehicle manufacturers are manufacturing a unitary floor panel in which a floor and a plurality of associated components are formed as a single unit through "giga casting" using a "giga press". However, a manufacturing cost of the integrated floor panel may be very high due to the expensive "giga press", complicated "giga casting", and the like. In addition, when trying to apply components of different materials, such as steel components and aluminum components, the above-mentioned "giga casting" may not be applied. That is, since "giga casting" may be applied only to components of a single material, there is a limitation in its extensibility.

The above information disclosed in this background section is only for enhancement of understanding of the background of the disclosure, and therefore, it may contain information that does not form the prior art that is already known to a person of ordinary skill in the art.

SUMMARY

The present disclosure relates to a unitary structural component for a vehicle floor. Particular embodiments relate to a unitary structural component for a vehicle floor in which a first cross portion, a second cross portion, and a central extension form a unitary one-piece structure.

Embodiments of the present disclosure can provide a unitary structural component for a vehicle floor, capable of improving rigidity, stiffness, strength, and crash performance of a vehicle by forming a first cross portion, a second cross portion, and a central extension as a unitary one-piece structure.

An exemplary embodiment of the present disclosure provides a unitary structure component for a vehicle floor, attached to the floor, and it may include a first cross portion, a second cross portion spaced apart from the first cross portion, and a central extension connecting the first cross portion and the second cross portion. The first cross portion, the second cross portion, and the central extension may form a unitary one-piece structure, and the central extension may extend along a central longitudinal axis of the floor.

Since the first cross portion, the second cross portion, and the central extension form the unitary one-piece structure, the number of parts attached to the floor may be one, and accordingly, an assembly process may be simplified, parts management may be facilitated, and in particular, the unitary structural component may be fixed to the floor very rigidly.

The first cross portion and the second cross section may be configured to have a plurality of reinforcing ribs formed therein. The reinforcing ribs may be configured to be connected in any one of a honeycomb structure and a lattice structure.

As such, stiffness of the first cross portion and the second cross portion and absorption efficiency of impact energy may be further improved by the reinforcing ribs.

The central extension may have a plurality of reinforcing ribs formed therein.

As such, longitudinal stiffness and NHV performance of the central extension may be further improved by the reinforcing ribs formed therein.

The unitary structural component for a vehicle floor according to an exemplary embodiment of the present disclosure may further include a front central extension extending from the first cross portion toward the front of the vehicle. The front central extension may be configured to be aligned with the central extension along a longitudinal direction of the vehicle.

As such, the front central extension may extend from the first cross portion to the front of the vehicle, and the front central extension may be aligned with the central extension, thereby additionally securing the longitudinal stiffness and collision performance of the unitary structural component.

A thickness of at least one of the first cross portion and the second cross portion, a thickness of the front central extension, and a thickness of the central extension may be configured to be different from each other.

As such, when manufactured through a casting process or a press process, the thickness of each portion may be configured to be different from each other, so that each portion may have a different stiffness or rigidity.

The thickness of the first cross portion and the thickness of the second cross portion may be the same, the thickness of the first cross portion and the thickness of the second cross portion may be thicker than the thickness of the front extension portion, and the thickness of the front central extension may be thicker than the thickness of the central extension.

As such, the thickness of the first cross portion and the thickness of the second cross portion that absorb the most collision energy when impact occurs are the thickest, and the thickness of the front central extension is relatively thicker than the thickness of the central extension, thereby improving impact absorption performance.

It may further include front side extensions configured to extend from the first cross portion toward the front of the vehicle and to be positioned symmetrically with respect to the front extension.

As such, as the pair of front side extensions are integrally connected to the first cross portion, the longitudinal stiffness of the unitary structural component may be further reinforced.

The thickness of at least one of the first cross portion or the second cross portion, the thickness of each of the front side extensions, and the thickness of the central extension may be configured to be different from each other.

The thickness of the first cross portion and the thickness of the second cross portion may be the same, the thickness of the first cross portion and the thickness of the second cross portion may be thicker than the thickness of the front side extension, and the thickness of the front side extension may be thicker than the thickness of the central extension.

As such, the thickness of the first cross portion and the thickness of the second cross portion that absorb the most collision energy when impact occurs are the thickest, and the thickness of each of the front side extensions is relatively thicker than the thickness of the central extension, thereby improving impact absorption performance.

The front central extension and each of the front side extensions may be configured to have a plurality of reinforcing ribs formed therein. The reinforcing ribs may be configured to be connected in any one of a honeycomb structure and a lattice structure.

Accordingly, the longitudinal stiffness and impact performance of the front central extension, the first side extension, and the second side extension may be improved by the reinforcing ribs.

The unitary structure component for a vehicle floor according to an exemplary embodiment of the present disclosure may further include a plurality of mounting portions and a plurality of end mounting portions configured to be raised upwardly from the first cross portion and the second cross portion.

As such, as the mounting portions and the end mounting portions are integrally formed with the first cross portion and the second cross portion, the stiffness of the first cross portion and the absorption efficiency of impact energy as well as the stiffness of the second cross portion may be further improved.

Each of the end mount portions may be configured to include a flange fixed to a side sill inner connected to opposite edges of each of the end mounting portions of the floor.

Accordingly, each of the cross portions may be firmly connected to the corresponding side sill inner.

The unitary structural component for a vehicle floor according to an exemplary embodiment of the present disclosure may further include a pair of side extensions configured to be symmetrically positioned with respect to the central extension.

The pair of side extensions may be configured to connect the first cross portion and the second cross portion.

As such, the NVH performance of the vehicle may be further improved by integrally connecting the third side extension and the fourth side extension to the first cross portion and the second cross portion.

The unitary structural component for a vehicle floor according to an exemplary embodiment of the present disclosure may further include a first edge reinforcing portion configured to connect a left end of the first cross portion and a left end of the second cross portion and a second edge reinforcing portion configured to connect a right end of the first cross portion and a right end of the second cross portion.

As such, the first edge reinforcing portion and the second edge reinforcing portion may connect the end mounting portion of the first cross portion and the end mounting portion of the second cross portion corresponding thereto, thereby further improving side impact performance of the vehicle.

The unitary structural component for a vehicle floor according to an exemplary embodiment of the present disclosure may be configured to have an aluminum-based material.

According to embodiments of the present disclosure, it is possible to improve the stiffness, strength, crash performance, etc. of the vehicle by forming a unitary one-piece structure of a plurality of ameliorated components attached to the floor. In particular, when vehicle impact occurs, the first cross portion, the second cross portion, and the central extension do not move independently of each other by forming the first cross portion, the second cross portion, and the central extension as a unitary one-piece structure, so that the impact performance of the vehicle may be significantly improved.

According to embodiments of the present disclosure, the first cross portion, the second cross portion, and the central extension may have different thicknesses, and durability and NVH performance of the vehicle may be improved by forming reinforcing ribs therein.

According to embodiments of the present disclosure, since the first cross portion, the second cross portion, and the central extension are integrally connected without joining, noise, buzz, squeak and rattle (BSR), etc. do not occur.

According to embodiments of the present disclosure, since the unitary structural component may be fixed to the floor of various materials through fasteners, welding, etc., compatibility and expandability may be secured.

According to the conventional art, as a plurality of cross members, a plurality of slave members, and a plurality of brackets are individually assembled on the floor, a number of assembly parts is relatively large, a weight thereof is relatively large, and an assembly process is complicated. In contrast, according to embodiments of the present disclosure, the first cross portion, the second cross portion, and the central extension may form a unitary body, so that they may be simplified to one part, weight may be significantly reduced, the assembly process may be reduced, and parts management may be made very easy.

The following reference identifiers may be used in connection with the accompanying drawings to describe exemplary embodiments of the present disclosure.

| 4: front structure | 5: floor |
|---|---|
| 11: first cross portion | 12: second cross portion |
| 13: central extension | 14: mounting portion |
| 15: front central extension | 16: first side extension |
| 17: second front side extension | 18: end mounting portion |
| 23, 24: side longitudinal member | 25a, 25b, 26c, 27c: side longitudinal member |
| 31: first side extension | 32: second side extension |
| 33: first edge reinforcing portion | 34: second edge reinforcing portion |

DETAILED DESCRIPTION OF ILLUSTRATIVE EMBODIMENTS

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Figure 1:
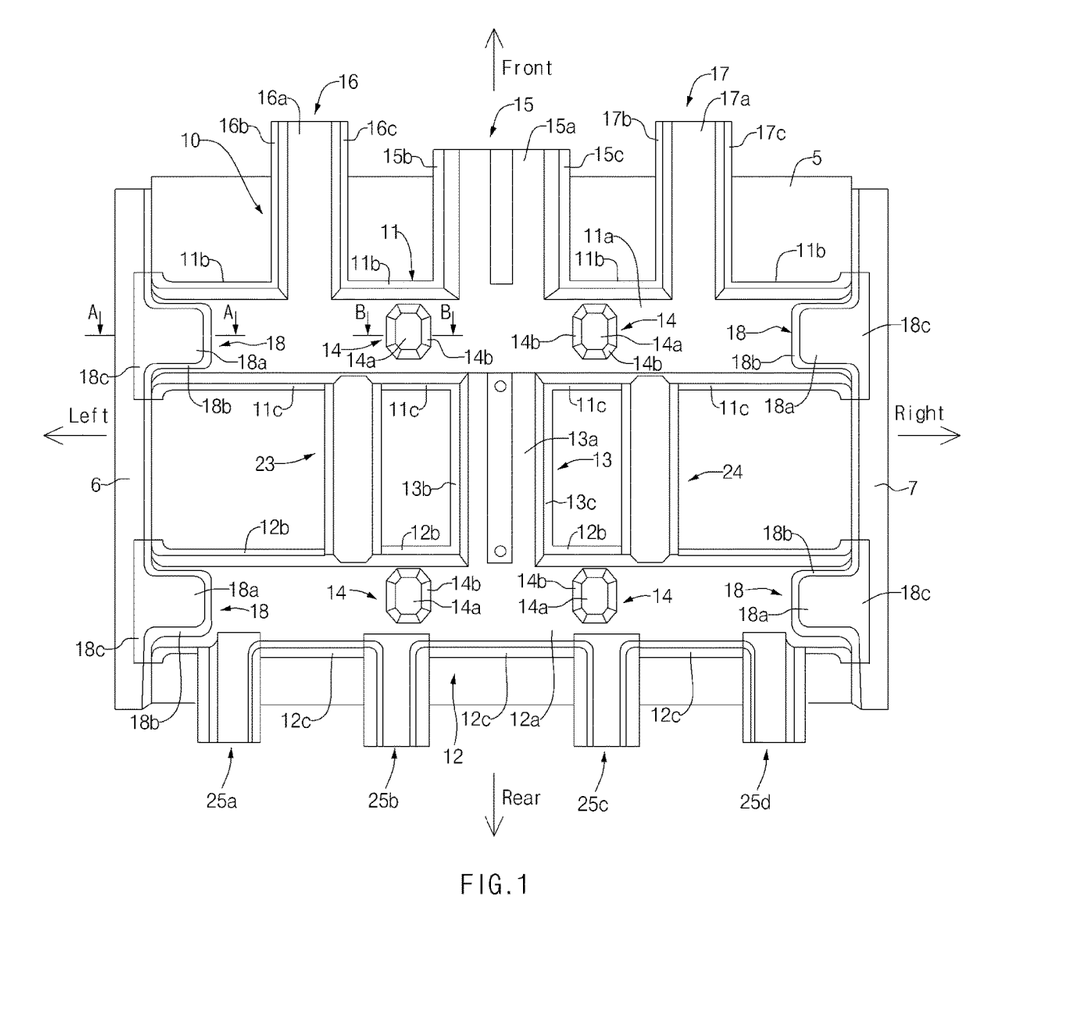
FIG. 1 illustrates a top plan view showing how a unitary structural component for a vehicle floor is fixed to the floor according to an exemplary embodiment of the present disclosure.
Figure 5:
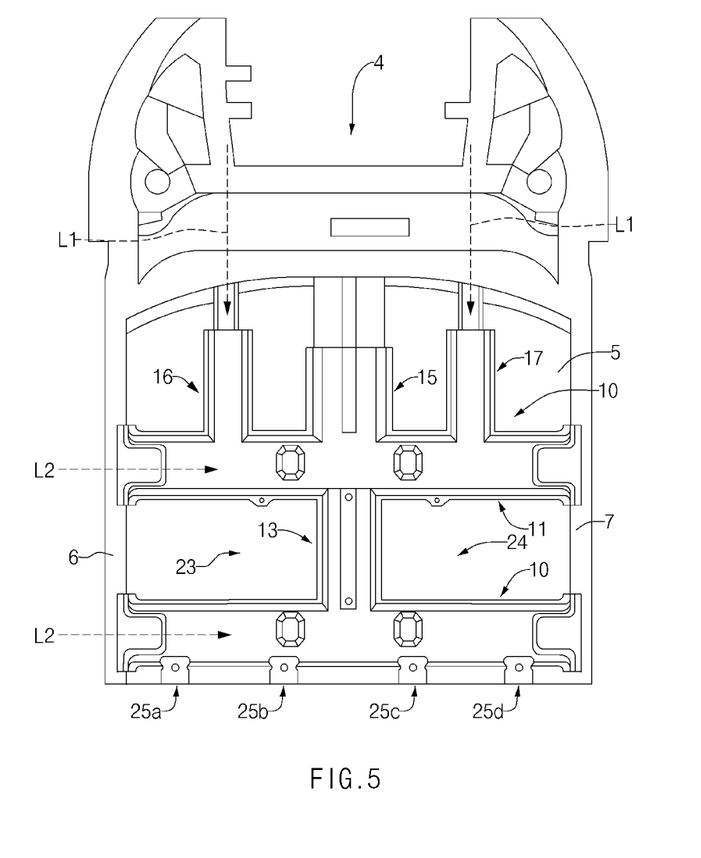
FIG. 5 illustrates a top plan view showing how a unitary structural component for a vehicle floor is connected to a front structure and the floor of a vehicle according an exemplary embodiment of the present disclosure.

Referring to FIG. 1, a unitary structural component 10 for a vehicle floor according to an exemplary embodiment of the present disclosure may be configured to be fixed to a floor 5 through fasteners, welding, or the like. The floor 5 may include a front edge facing the front of a vehicle and a rear edge facing the rear of the vehicle. A pair of side sill inners 6 and 7 may be individually respectively connected to opposite edges of the floor 5 through fasteners, welding, or the like. Referring to FIG. 5, the front edge of the floor 5 may be a central floor panel connected to a front structure 4 of the vehicle.

Referring to FIG. 1, the unitary structural component 10 may include a first cross portion 11, a second cross portion 12 positioned behind the first cross portion 11, and a central extension 13 for connecting the first cross portion 12 and the second cross portion 12. The first cross portion 11, the second cross portion 12, and the central extension 13 may constitute a unitary one-piece structure through a casting process such as die casting or low pressure casting.

According to an exemplary embodiment of the present disclosure, the unitary structural component 10 may be made of an aluminum base material such as 6000 series or 7000 series.

Figure 3:
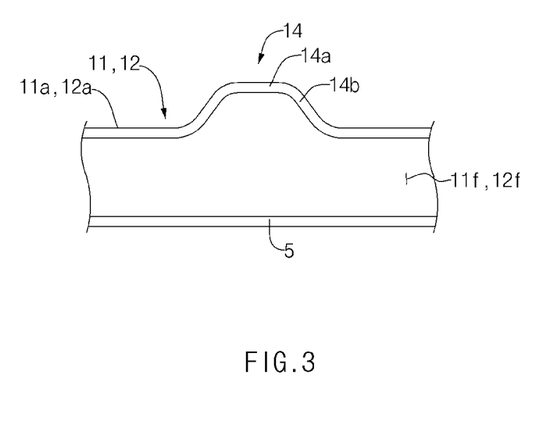
FIG. 3 illustrates a cross-sectional view taken along a line B-B of FIG. 1.

Referring to FIG. 1 and FIG. 3, the first cross portion 11 may be positioned adjacent to the front edge of the floor 5, and the first cross portion 11 may include a first channel 11a having a cavity 11f defined therein. The first channel 11a may have a channel shape including an upper wall, a front wall facing the front edge of the floor 5, and a rear wall facing the rear edge of the floor 5. The cavity 11f of the first channel 11a may be defined by the upper wall, the front wall, and the rear wall, and a lower portion of the cavity 11f may be opened. Since the first channel 11a is attached to the upper surface of the floor 5, the first channel 11a and the floor 5 may form a closed cross-section. The first cross portion 11 may include a front flange 11b extending from the front wall of the first channel 11a toward the front edge of the floor 5, and a rear flange 11c extending from the rear wall of the first channel 11a toward the rear edge of the floor 5. The first cross portion 11 may correspond to a front cross member or a front seat cross member of an existing vehicle for mounting a vehicle seat.

Referring to FIG. 1 and FIG. 3, the second cross portion 12 may be spaced apart from the first cross portion 11 toward the rear of the vehicle and the rear edge of the floor 5. The second cross portion 12 may be positioned adjacent to the rear edge of the floor 5. The second cross portion 12 may include a second channel 12a having a cavity 12f defined therein. The second channel 12a may have a channel shape including an upper wall, a front wall facing the front edge of the floor 5, and a rear wall facing the rear edge of the floor 5. The cavity 12f of the second channel 12a may be defined by the upper wall, the front wall, and the rear wall, and a lower portion of the cavity 12f may be opened. Since the second channel 12a is attached to the upper surface of the floor 5, the second channel 12a and the floor 5 may form a closed cross-section. The second cross portion 12 may include a front flange 12b extending from the front wall of the second channel 12a toward the front edge of the floor 5, and a rear flange 12c extending from the rear wall of the second channel 12a toward the rear edge of the floor 5. The second cross portion 12 may correspond to a rear cross member or a rear seat cross member of an existing vehicle for mounting a vehicle seat.

Referring to FIG. 1 and FIG. 3, the central extension 13 may be configured to integrally connect the first cross portion 11 and the second cross portion 12. The central extension 13 may extend along a central longitudinal axis of the floor 5. A front end of the central extension 13 may be directly connected to a central portion of the first cross portion 11, and a rear end of the central extension 13 may be directly connected to a central portion of the second cross portion 12. The central extension 13 may include a central channel 13a having a cavity 13f defined therein. The central channel 13a may have a channel shape including an upper wall, a left wall facing the left edge of the floor 5, and a right wall facing the right edge of the floor 5. The cavity 13f of the central channel 13a may be defined by the upper wall, the left wall, and the right wall, and the cavity 13f may have an open lower portion thereof. The central channel 13a and the floor 5 may form a closed cross-section by attaching the central extension 13 to an upper surface of the floor 5. The central extension 13 may include a right flange 13b extending from the right wall of the central channel 13a toward the right edge of the floor 5 and a left flange 13c extending from the left wall of the central channel 13a toward the left edge of the floor 5. The central extension may correspond to a central longitudinal member of an existing vehicle extending along a central longitudinal axis of the floor.

A front end of the central channel 13a of the central extension 13 may be integrally connected to the first channel 11a of the first cross portion 11, and a rear end of the central channel 13a of the central extension 13 may be integrally connected to the second channel 12a of the second cross portion 12. A front end of the right flange 13b of the central extension 13 and a front end of the left flange 13c of the central extension 13 may be integrally connected to the rear flange 11c of the first cross portion 11, and a rear end of the right flange 13b of the central extension 13 and a rear end of the left flange 13c of the central extension 13 may be integrally connected to the front flange 12b of the second cross portion 12. Accordingly, the central extension 13 may be integrally connected to the first cross portion 11 and the second cross portion 12, so that the central extension 13, the first cross portion 11, and the second cross portion 12 may form a unitary one-piece structure.

A plurality of mounting portions 14 and a plurality of end mounting portions 18 for mounting the vehicle seat may be integrally formed in the first cross portion 11 and the second cross portion 12, and thus the mounting portions 14, the end mounting portions 18, the first cross portion 11, and the second cross portion 12 may constitute a unitary one-piece structure.

The mount portions 14 may be integrally formed in the first channel 11a of the first cross portion 11 and the second channel 12a of the second cross portion 12. Referring to FIG. 3, each of the mounting portions 14 may be raised upwardly from the upper wall of the corresponding channel 11a and 12a of the respective cross portion 11 and 12. Each of the mounting portions 14 may include a top wall 14a and a side wall 14b extending from the top wall 14a to top walls of the channels 11a and 12a of the corresponding cross portions 11 and 12. Each of the mounting portions 14 may correspond to a mounting bracket of an existing vehicle for mounting a seat.

Figure 2:
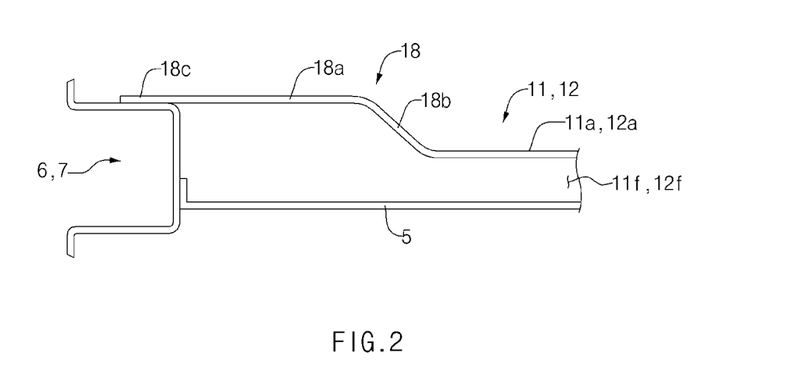
FIG. 2 illustrates a cross-sectional view taken along a line A-A of FIG. 1.

A pair of end mounting portions 18 may be raised from opposite ends of the corresponding cross portions 11 and 12, and the mounting portions 14 may be raised upwardly from each of the cross portions 11 and 12 between the pair of end mounting portions 18. Referring to FIG. 2, each of the end mounting portions 18 may be raised upwardly from ends of the corresponding cross portions 11 and 12. Each of the end mounting portions 18 may include a top wall 18a, a side wall 18b extending from the top wall 18a to top walls of the channels 11a and 12a of the corresponding cross portions 11 and 12, and flanges 18c fixed to the corresponding side sill inners 6 and 7. Particularly, the flanges 18c of each of the end mounting portions 18 may be fixed to the corresponding side sill inners 6 and 7 through flow drilling screws (FDS), blind rivets, or the like. Each of the end mounting portions 18 may correspond to an end mounting bracket of an existing vehicle for mounting a vehicle seat.

Referring to FIG. 1 and FIG. 3, the unitary structural component 10 according to an exemplary embodiment of the present disclosure may further include a front central extension 15 extending from the first cross portion 11 toward the front of the vehicle. The front central extension 15 may be aligned with the central extension 13 along a longitudinal direction of the vehicle, and the front central extension 15 may be integrally formed with the first cross portion 11, so that the front central extension 15 and the first cross portion 11 may form a unitary one-piece structure. Accordingly, longitudinal stiffness of the unitary structural component 10 may be further reinforced.

Referring to FIG. 1 and FIG. 3, the front central extension 15 may include a front central channel 15a having a cavity 15f defined therein. The front central channel 15a may have a channel shape including an upper wall, a left wall facing the left edge of the floor 5, and a right wall facing the right edge of the floor 5. The cavity 15f of the front central channel 15a may be defined by the upper wall, the left wall, and the right wall, and the cavity 15f may have an open lower portion thereof. The front central channel 15a and the floor 5 may form a closed cross-section by attaching the front central extension 15 to an upper surface of the floor 5. The front central extension 15 may include a right flange 15b extending from the right wall of the front central channel 15a toward the right edge of the floor 5 and a left flange 15c extending from the left wall of the front central channel 15a toward the left edge of the floor 5. The front central extension may correspond to a front central longitudinal member of an existing vehicle extending along a central longitudinal axis of the floor.

A front end of the front central channel 15a of the front central extension 15 may be integrally connected to the first channel 11a of the first cross portion 11, and a rear end of the right flange 15b of the front central extension 15 may be integrally connected to the front flange 11b of the first cross portion 11. Accordingly, the front central extension 15 may be integrally connected to the first cross portion 11, so that the front central extension 15 and the first cross portion 11 may form a unitary one-piece structure.

Referring to FIG. 1 and FIG. 3, the unitary structural component 10 according to an exemplary embodiment of the present disclosure may further include front side extensions 16 and 17 of one phase extending from the first cross portion 11 toward the front of the vehicle. Hereinafter, for better comprehension and ease of description, the pair of front side extensions 16 and 17 are referred to as being divided into a first front side extension 16 and a second front side extension 17. The first front side extension 16 and the second front side extension 17 may be symmetrically positioned with respect to the front central extension 15. The first front side extension 16 and the second front side extension 17 may be integrally formed on the first cross portion 11, whereby the first front side extension 16, the second front side extension 17, and the first cross portion 11 may form a unitary one-piece structure. The first front side extension 16 may be spaced apart from a left edge of the front central extension 15 along a width direction of the vehicle, and the second front side extension 17 may be spaced apart from a right edge of the front central extension 15 along the width direction of the vehicle.

The first front side extension 16 may include a first front side channel 16a having a cavity 16f defined therein. The first front side channel 16a may have a channel shape including an upper wall, a left wall facing the left edge of the floor 5, and a right wall facing the right edge of the floor 5. The cavity 16f of the first front side channel 16a may be defined by the upper wall, the left wall, and the right wall, and the cavity 16f may have an open lower portion thereof. The first front side channel 16a and the floor 5 may form a closed cross-section by attaching the first front side extension 16 to an upper surface of the floor 5. The first front side extension 16 may include a left flange 10 extending from a left wall of the first front side channel 16a toward a left edge of the floor 5 and a right flange 16c extending from a right wall of the first front side channel 16a toward a left edge of the floor 5.

The second front side extension 17 may include a second front side channel 17a having a cavity 17f defined therein. The second front side channel 17a may have a channel shape including an upper wall, a left wall facing the left edge of the floor 5, and a right wall facing the right edge of the floor 5. The cavity 17f of the second front side channel 17a may be defined by the upper wall, the left wall, and the right wall, and the cavity 16f may have an open lower portion thereof. The second front side channel 17a and the floor 5 may form a closed cross-section by attaching the second front side extension 17 to an upper surface of the floor 5. The second front side extension 17 may include a left flange 17b extending from a left wall of the second front side channel 17a toward a left edge of the floor 5 and a right flange 17c extending from a right wall of the second front side channel 17a toward a right edge of the floor 5.

The first front side extension 16 and the second front side extension 17 may correspond to front side longitudinal members of an existing vehicle positioned on opposite sides of the front central longitudinal member.

A rear end of the first front side channel 16a of the first front side extension 16 may be integrally connected to the first channel 11a of the first cross portion 11, and a rear end of the second front side channel 17a of the second front side extension 17 may be integrally connected to the first channel 11a of the first cross portion 11. A rear end of the left flange 10 of the first front side extension 16 and a rear end of the right flange 16c of the first front side extension 16 may be integrally connected to the front flange 11b of the first cross portion 11, and a rear end of the left flange 17b of the second front side extension 17 and a rear end of the right flange 17c of the second front side extension 17 may be integrally connected to the front flange 11b of the first cross portion 11. Accordingly, the first front side extension 16 and the second front side extension 17 may be integrally connected to the first cross portion 11, whereby the first front side extension 16, the second front side extension 17, and the first cross portion 11 may form a unitary one-piece structure.

Referring to FIG. 1, a pair of side longitudinal members 23 and 24 may be symmetrically positioned with respect to the central extension 13. According to an exemplary embodiment of the present disclosure, the pair of side longitudinal members 23 and 24 may be manufactured separately for the unitary structural component 10. Each of the side longitudinal members 23 and 24 may be configured to connect the first cross portion 11 and the second cross portion 12. A plurality of rear longitudinal members 25a, 25b, 25c, and 25d may be connected to the second cross portion 12, and the rear longitudinal members 25a, 25b, 25c, and 25d may extend from the second cross portion 12 toward the rear of the vehicle.

The first cross portion 11, the second cross portion 12, the front central extension 15, the first front side extension 16, and the second front side extension 17 may act as an impact absorbing member that absorbs impact energy when an impact occurs. The central extension 13 may serve as an NVH performance member for improving NVH performance. The mounting portions 14 and the end mounting portions 18 may serve as a durability improvement member for ensuring durability.

The unitary structural component 10 according to an exemplary embodiment of the present disclosure may be configured to have different thicknesses when manufactured through a casting process or a pressing process, etc., and thus may have a different stiffness for each portion.

According to an exemplary embodiment of the present disclosure, a thickness of the first cross portion 11 may be equal to that of the second cross portion 12. According to another exemplary embodiment of the present disclosure, the thickness of the first cross portion 11 may be slightly different from the thickness of the second cross portion 12 depending on a structure of the vehicle.

Since the first cross portion 11 and the second cross portion 12 are configured to absorb the most impact energy when an impact occurs, they may have a relatively thick thickness compared to other portions. Accordingly, the stiffness of the first cross portion 11 and the second cross portion 12, which are the impact absorbing members, may be the greatest.

The front central extension 15 may be relatively thinner than the thickness of the first cross portion 11 and the thickness of the second cross portion 12, and the central extension 13 may be relatively thinner than a thickness of the front central extension 15 as an NVH performance member. That is, the thickness of the first cross portion 11 and the thickness of the second cross portion 12 are thicker than the thickness of the front central extension 15, and the thickness of the front central extension 15 is thicker than the thickness of the central extension 13. In addition, each of the front side extensions 16 and 17 may be relatively thinner than the thickness of the first cross portion 11 and the thickness of the second cross portion 12, and each of the front side extensions 16 and 17 may be thicker than the thickness of the central extension 13. In addition, the thickness of each of the front side extensions 16 and 17 may be the same as the thickness of the front central extension 15 or may be slightly thinner than the thickness of the front central extension 15. For example, the thickness of the first cross portion 11 and the thickness of the second cross portion 12 are 6.0 mm, the thickness of the front central extension 15 is 4.0 mm, the thickness of each of the side extensions is in a range of 3.0 to 4.0 mm, the thickness of the central extension 13 is in a range of 2.0 to 3.0 mm, and the thickness of the mounting portion 14 and the thickness of the end mounting portion 18 are 2.0 mm.

Figure 4:
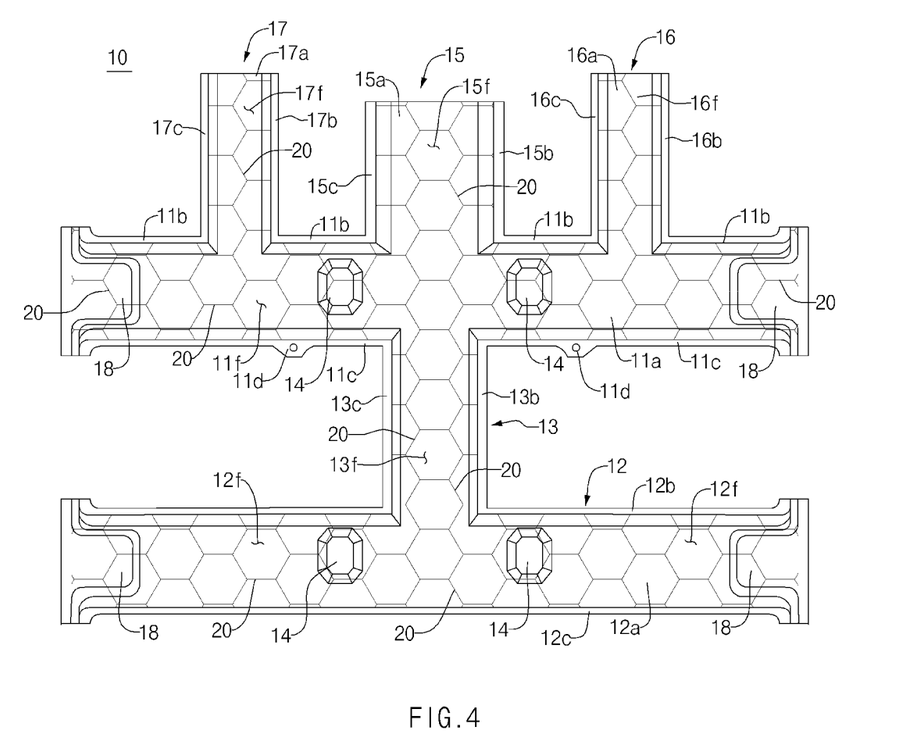
FIG. 4 illustrates a bottom view showing a bottom surface of a unitary structural component for a vehicle floor according to an exemplary embodiment of the present disclosure.

Referring to FIG. 4, according to an exemplary embodiment of the present disclosure, a plurality of reinforcing ribs 20 may be formed in the cavity 11f of the first cross portion 11, the cavity 12f of the second cross portion 12, the cavity 15f of the front central extension 15, the cavity 16f of the first front side extension 16, and the cavity 17f of the second front side extension 17, which are impact absorbing members, and the reinforcing ribs 20 may be connected in various structures. According to an example, the reinforcing ribs 20 may be connected in any one of a honeycomb structure and a lattice structure. Accordingly, the first cross portion 11, the second cross portion 12, the front central extension 15, the first front side extension 16, and the second front side extension 17, which are the impact absorbing members, may additionally secure longitudinal stiffness and absorption efficiency of impact energy by the reinforcing ribs 20.

Referring to FIG. 4, according to an exemplary embodiment of the present disclosure, the reinforcing ribs 20 may be formed in the cavity 13f of the central extension 13 which is an NVH performance member, and the reinforcing ribs 20 may be connected in various structures. According to an example, the reinforcing ribs 20 may be connected in any one of a honeycomb structure and a lattice structure. Accordingly, since the central extension 13, which is the NVH performance member, may secure additional stiffness by the reinforcing ribs 20, it is possible to improve longitudinal stiffness and NVH performance of the vehicle.

Referring to FIG. 4, according to an exemplary embodiment of the present disclosure, the reinforcing ribs 20 may be formed in the cavity 14f of each of the mounting portions 14 and in the cavity 18f of each of the end mounting portions 18 as durability improvement members, and the reinforcing ribs 20 may be connected in various structures. According to an example, the reinforcing ribs 20 may be connected in any one of a honeycomb structure and a lattice structure. Accordingly, each of the mounting portions 14 and each of the end mounting portions 18 as durability improvement members may further improve stiffness and durability by the reinforcing ribs 20.

Referring to FIG. 4, the reinforcing ribs 20 may be configured to be continuously connected in the cavity 11f of the first cross portion 11, the cavity 12f of the second cross portion 12, the cavity 15f of the front central extension 15, the cavity 16f of the first front side extension 16, the cavity 17f of the second front side extension 17, the cavity 13f of the central extension 13, the cavities 14f of the mounting portions 14, and the cavities 18f of the end mounting portions 18, thereby enhancing the overall stiffness of the unitary structural component 10.

In the unitary structural component 10 according to an exemplary embodiment of the present disclosure, the first cross portion 11, the second cross portion 12, the central extension 13, the front central extension 15, the first front side extension 16, and the second front side extension 17 may form a unitary one-piece structure. Particularly, since there is no joint portion between the first cross portion 11, the second cross portion 12, the central extension 13, the front central extension 15, the first front side extension 16, and the second front side extension 17, energy absorption efficiency may be improved.

In an existing vehicle, a front longitudinal member, a mounting bracket, and an end mounting bracket may be fixed to a seat cross member through welding so that components may behave independently of each other due to separation of the components (welding fracture, part bending, etc.) in the event of a frontal or side impact of a vehicle, thus it may be difficult to secure impact performance. In contrast, in the unitary structural component 10 according to an exemplary embodiment of the present disclosure, the first cross portion 11, the second cross portion 12, the central extension 13, the front central extension 15, the first front side extension 16, the second front side extension 17, the mounting portions 14, and the end mounting portions 18 form a unitary one-piece structure so that there is no joint portion, and thus an absorption efficiency of impact energy may be high, and impact performance thereof may be significantly improved without additional reinforcement.

Referring to FIG. 5, when an impact load Li is transferred along a longitudinal direction of the vehicle during front impact of the vehicle, the front central extension 15, the first front side extension 16, the second front side extension 17, the first cross portion 11, the second cross portion 12, and the central extension 13 may improve the energy absorption efficiency through the reinforcing ribs 20 formed therein.

Referring to FIG. 5, by forming the mounting portion 14 and the end mounting portion 18 integrally with each of the cross portions 11 and 12, when the impact load Li is transferred along the width direction of the vehicle during side impact of the vehicle, the mounting portion 14 and the end mounting portion 18 do not move independently from each of the cross portions 11 and 12, thereby improving the absorption efficiency of impact energy. The front central extension 15, each of the front side extensions 16 and 17, each of the cross portions 11 and 12, and the central extension 13 may have different thicknesses, and the front central extension 15, each of the front side extensions 16 and 17, each of the cross portions 11 and 12, and the central extension 13 may include the reinforcing ribs 20, thereby improving the absorption efficiency of impact energy and/or the NVH performance.

Figure 6:
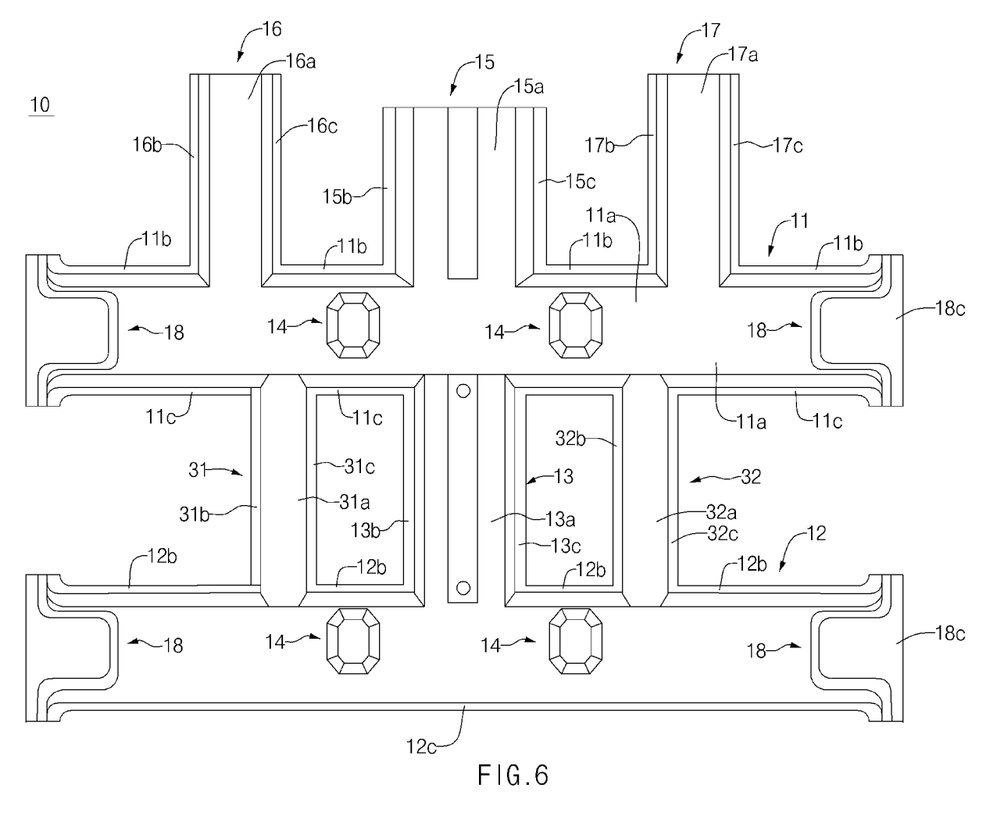
FIG. 6 illustrates a top plan view showing a unitary structural component for a vehicle floor according to another exemplary embodiment of the present disclosure.

Referring to FIG. 6, the unitary structural component 10 according to another exemplary embodiment of the present disclosure may further include a pair of side extensions 31 and 32 symmetrically positioned with respect to a central extension 13. Hereinafter, for better comprehension and ease of description, the pair of side extensions 31 and 32 are divided into and referred to as a first side extension 31 and a second side extension 32. Each of the side extensions 31 and 32 may be configured to integrally connect the first cross portion 11 and the second cross portion 12.

A front end of the first side extension 31 may be directly connected to a left side of the first cross portion 11, and a rear end of the first side extension 31 may be directly connected to a left side of the second cross portion 12. The first side extension 31 may include a first side channel 31a having a cavity 31f defined therein. The first side channel 31a may have a channel shape including an upper wall, a left wall facing the left edge of the floor 5, and a right wall facing the right edge of the floor 5. The cavity 31f of the first side channel 31a may be defined by the upper wall, the left wall, and the right wall, and the cavity 31f may have an open lower portion thereof. The first side channel 31a and the floor 5 may form a closed cross-section by attaching the first side extension 31 to an upper surface of the floor 5. The first side extension 31 may include a right flange 31b extending from the right wall of the first side channel 31a toward the right edge of the floor 5, and a left flange 31c extending from the left wall of the first side channel 31a toward the left edge of the floor 5.

A front end of the first side channel 31a of the first side extension 31 may be integrally connected to the first channel 11a of the first cross portion 11, and a rear end of the first side channel 31a of the first side extension 31 may be integrally connected to the second channel 12a of the second cross portion 12. A front end of the right flange 31b of the first side extension 31 and a front end of the left flange 31c of the first side extension 31 may be integrally connected to the rear flange 11c of the first cross portion 11, and a rear end of the right flange 31b of the first side extension 31 and a rear end of the left flange 31c of the first side extension 31 may be integrally connected to the front flange 12b of the second cross portion 12. Accordingly, the first side extension 31 may be integrally connected to the first cross portion 11 and the second cross portion 12, so that the first side extension 31, the first cross portion 11, and the second cross portion 12 may form a unitary one-piece structure.

A front end of the second side extension 32 may be directly connected to a right side of the first cross portion 11, and a rear end of the second side extension 32 may be directly connected to a right side of the second cross portion 12. The second side extension 32 may include a second side channel 32a having a cavity 32f defined therein. The second side channel 32a may have a channel shape including an upper wall, a left wall facing the left edge of the floor 5, and a right wall facing the right edge of the floor 5. The cavity 32f of the second side channel 32a may be defined by the upper wall, the left wall, and the right wall, and the cavity 32f may have an open lower portion thereof. The second side channel 32a and the floor 5 may form a closed cross-section by attaching the second side extension 32 to an upper surface of the floor 5. The second side extension 32 may include a right flange 32b extending from the right wall of the second side channel 32a toward the right edge of the floor 5, and a left flange 32c extending from the left wall of the second side channel 32a toward the left edge of the floor 5.

A front end of the second side channel 32a of the second side extension 32 may be integrally connected to the first channel 11a of the first cross portion 11, and a rear end of the second side channel 32a of the second side extension 32 may be integrally connected to the second channel 12a of the second cross portion 12. A front end of the right flange 32b of the second side extension 32 and a front end of the left flange 32c of the second side extension 32 may be integrally connected to the rear flange 11c of the first cross portion 11, and a rear end of the right flange 32b of the second side extension 32 and a rear end of the left flange 32c of the second side extension 32 may be integrally connected to the front flange 12b of the second cross portion 12. Accordingly, the second side extension 32 may be integrally connected to the first cross portion 11 and the second cross portion 12, so that the second side extension 32, the first cross portion 11, and the second cross portion 12 may form a unitary one-piece structure.

The first side extension 31 and the second side extension 32 may correspond to a pair of side longitudinal members of an existing vehicle positioned at opposite sides of a central longitudinal member of the existing vehicle.

As such, the first side extension 31 and the second side extension 32 may be configured to connect the first cross portion 11 and the second cross portion 12, thereby further improving NVH performance of the vehicle.

Figure 7:
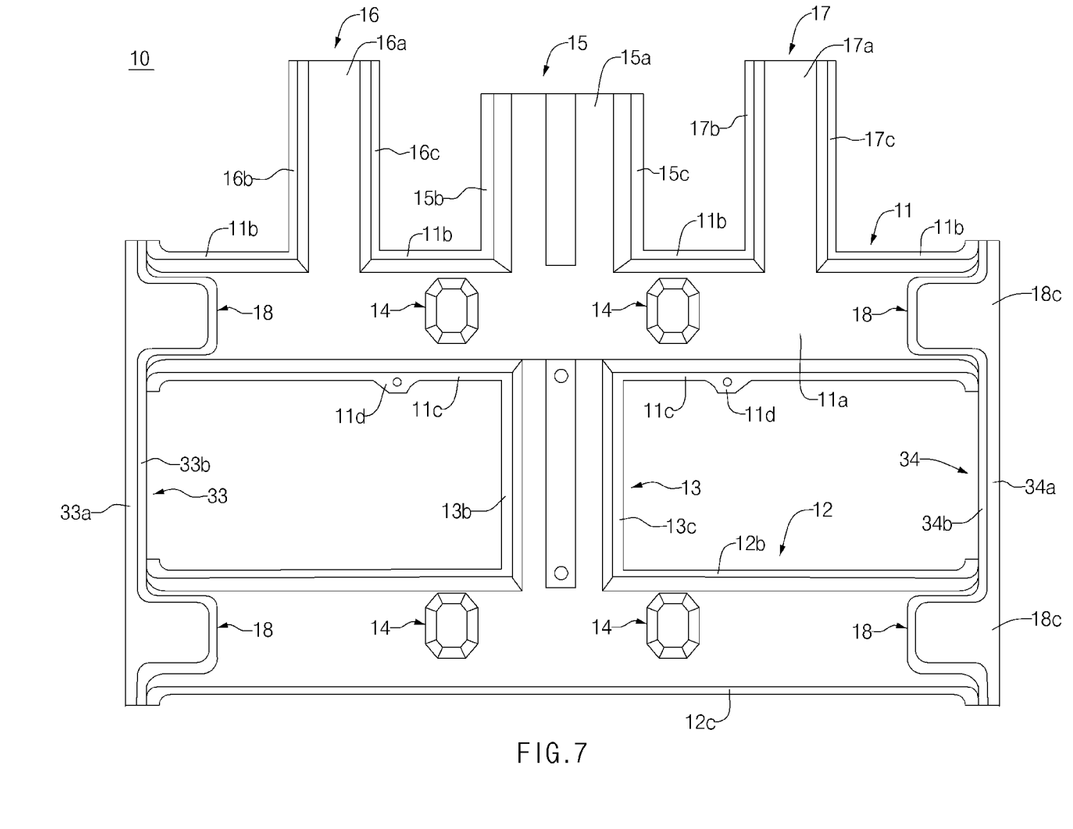
FIG. 7 illustrates a top plan view showing a unitary structural component for a vehicle floor according to another exemplary embodiment of the present disclosure.

Referring to FIG. 7, the unitary structural component 10 according to another exemplary embodiment of the present disclosure may further include a first edge reinforcing portion 33 connecting a left end of the first cross portion 11 and a left end of the second cross portion 12, and a second edge reinforcing portion 34 connecting a right end of the first cross portion 11 and a right end of the second cross portion 12. The first and second edge reinforcing portions 33 and 34 may be configured to integrally connect the first cross portion 11 and the second cross portion 12.

The first edge reinforcing portion 33 may include a connector 33b connecting the left end mounting portion 18 of the first cross portion 11 and the left end mounting portion 18 of the second cross portion 12, and a flange 33a connecting the flange 18c of the left end mounting portion 18 of the first cross portion 11 and the flange 18c of the left end mounting portion 18 of the second cross portion 12.

The second edge reinforcing portion 34 may include a connector 34b connecting the right end mounting portion 18 of the first cross portion 11 and the right end mounting portion 18 of the second cross portion 12, and a flange 18c of the right end mounting portion 18 of the first cross portion 11 and a flange 18c of the right end mounting portion 18 of the second cross portion 12.

As such, the first edge reinforcing portion 33 and the second edge reinforcing portion 34 may connect the end mounting portion 18 of the first cross portion 11 and the end mounting portion 18 of the second cross portion 12 corresponding thereto, thereby further improving side impact performance of the vehicle.

The unitary structural component 10 may be made of an aluminum-based material, and the floor 5 may be made of aluminum, steel, CFRP, or the like. When the floor 5 is made of an aluminum-based material, the unitary structural component 10 may be firmly fixed to the floor 5 through spot welding or the like. When the floor 5 is made of a steel or CFRP material, the unitary structural component 10 may be fixed to the floor 5 through various dissimilar material bonding mechanisms. That is, compatibility and expandability for mounting of the unitary structural component 10 may be secured.

In the unitary structural component 10 according to an exemplary embodiment of the present disclosure, an assembly process may be simplified and parts management may be made easier by forming the first cross portion 11, the second cross portion 12, and the central extension 13 as a unitary one-piece structure.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A unitary structural component for attaching to a floor of a vehicle, the unitary structural component comprising:
   a first cross portion;
   a second cross portion spaced apart from the first cross portion;
   a central extension connecting the first cross portion and the second cross portion and extending along a central longitudinal axis of the floor, wherein the first cross portion, the second cross portion, and the central extension define a unitary one-piece structure and wherein a thickness of the first cross portion and a thickness of the second cross portion are greater than a thickness of the central extension; and
   a front central extension extending toward a front of the vehicle from the first cross portion, wherein the front central extension is aligned with the central extension along a longitudinal direction of the vehicle.

2. The unitary structural component of claim 1, wherein the first cross portion and the second cross portion each comprise a plurality of reinforcing ribs formed therein.

3. The unitary structural component of claim 2, wherein the reinforcing ribs are connected in a honeycomb structure or a lattice structure.

4. The unitary structural component of claim 1, further comprising a plurality of mounting portions and a plurality of end mounting portions raised upwardly from the first cross portion and the second cross portion.

5. The unitary structural component of claim 4, wherein each of the end mounting portions comprises a flange fixed to a side sill inner connected to opposite edges of each of the end mounting portions of the floor.

6. The unitary structural component of claim 1, further comprising a pair of side extensions symmetrically positioned with respect to the central extension, wherein the pair of side extensions connects the first cross portion and the second cross portion.

7. The unitary structural component of claim 1, further comprising:

a first edge reinforcing portion connecting a left end of the first cross portion and a left end of the second cross portion; and a second edge reinforcing portion connecting a right end of the first cross portion and a right end of the second cross portion.

8. The unitary structural component of claim 1, wherein the first cross portion, the second cross portion, and the central extension comprise an aluminum-based material.

9. A unitary structural component for attaching to a floor of a vehicle, the unitary structural component comprising:
   a first cross portion;
   a second cross portion spaced apart from the first cross portion;
   a central extension connecting the first cross portion and the second cross portion and extending along a central longitudinal axis of the floor, wherein the first cross portion, the second cross portion, and the central extension define a unitary one-piece structure; and
   a front central extension extending toward a front of the vehicle from the first cross portion, wherein the front central extension is aligned with the central extension along a longitudinal direction of the vehicle.

10. The unitary structural component of claim 9, wherein a thickness of the first cross portion or the second cross portion, a thickness of the front central extension, and a thickness of the central extension are different from each other.

11. The unitary structural component of claim 10, wherein:
   the thickness of the first cross portion and the thickness of the second cross portion are equal; and
   the thickness of the first cross portion and the thickness of the second cross portion are thicker than the thickness of the front central extension, and the thickness of the front central extension is thicker than the thickness of the central extension.

12. The unitary structural component of claim 9, further comprising front side extensions extending from the first cross portion toward the front of the vehicle and positioned symmetrically with respect to the front central extension.

13. The unitary structural component of claim 12, wherein a thickness of the first cross portion or the second cross portion, a thickness of each of the front side extensions, and a thickness of the central extension are different from each other.

14. The unitary structural component of claim 13, wherein:
   the thickness of the first cross portion and the thickness of the second cross portion are equal; and
   the thickness of the first cross portion and the thickness of the second cross portion are thicker than the thickness of the front side extensions, and the thickness of the front side extensions is thicker than the thickness of the central extension.

15. The unitary structural component of claim 12, wherein the front central extension and each of the front side extensions comprise a plurality of reinforcing ribs formed therein.

16. The unitary structural component of claim 15, wherein the reinforcing ribs are connected in a honeycomb structure or a lattice structure.

17. A vehicle comprising:
   a vehicle body;
   a floor coupled to the vehicle body;
   a pair of side sill inners coupled to opposite edges of the floor; and
   a unitary one-piece structure coupled to the floor, the unitary one-piece structure comprising a first cross portion, a second cross portion spaced apart from the first cross portion, a central extension connecting the first cross portion and the second cross portion and extending along a central longitudinal axis of the floor, and a front central extension extending toward a front of the vehicle from the first cross portion, wherein the front central extension is aligned with the central extension along a longitudinal direction of the vehicle and wherein a thickness of the first cross portion and a thickness of the second cross portion are greater than a thickness of the central extension.

18. The vehicle of claim 17, wherein the first cross portion and the second cross portion each comprise a plurality of reinforcing ribs formed therein.

19. The vehicle of claim 17, further comprising a plurality of mounting portions and a plurality of end mounting portions raised upwardly from the first cross portion and the second cross portion.

20. The vehicle of claim 17, further comprising a pair of side extensions symmetrically positioned with respect to the central extension, wherein the pair of side extensions connects the first cross portion and the second cross portion.

* * * * *